(12) United States Patent
Martin

(10) Patent No.: US 8,285,204 B2
(45) Date of Patent: Oct. 9, 2012

(54) METHOD AND DEVICE FOR TRANSMITTING DATA BY CHARGE MODULATION

(75) Inventor: Michel Martin, Rognes (FR)

(73) Assignee: Inside Secure, Aix-en-Provence Cedex (FR)

( * ) Notice: Subject to any disclaimer, the term of this patent is extended or adjusted under 35 U.S.C. 154(b) by 925 days.

(21) Appl. No.: 12/299,391

(22) PCT Filed: May 2, 2007

(86) PCT No.: PCT/IB2007/001139
§ 371 (c)(1),
(2), (4) Date: Jan. 29, 2009

(87) PCT Pub. No.: WO2007/129187
PCT Pub. Date: Nov. 15, 2007

(65) Prior Publication Data
US 2009/0203313 A1    Aug. 13, 2009

(30) Foreign Application Priority Data
May 5, 2006 (FR) .................................. 06 04086

(51) Int. Cl.
*H04B 5/00* (2006.01)
*H04B 1/38* (2006.01)
(52) U.S. Cl. .......................................... 455/41.1; 455/73
(58) Field of Classification Search .................. 455/41.1, 455/73
See application file for complete search history.

(56) References Cited

U.S. PATENT DOCUMENTS

| 5,699,313 | A  | * | 12/1997 | Foss et al. ..................... 365/226 |
| 5,828,620 | A  | * | 10/1998 | Foss et al. ..................... 365/226 |
| 6,054,925 | A  | * | 4/2000  | Proctor et al. ............. 340/572.7 |
| 6,700,551 | B2 | * | 3/2004  | Charrat ......................... 343/895 |
| 6,778,070 | B1 |   | 8/2004  | Thomas |
| 2002/0072342 | A1 | * | 6/2002 | Charrat ......................... 455/205 |
| 2002/0077061 | A1 | * | 6/2002 | Charrat ........................... 455/41 |
| 2003/0169152 | A1 | * | 9/2003 | Charrat et al. ............... 340/10.1 |
| 2004/0256467 | A1 | * | 12/2004 | Clemens et al. .............. 235/492 |
| 2005/0133605 | A1 | * | 6/2005 | Koyama et al. ............... 235/492 |
| 2008/0166962 | A1 | * | 7/2008 | Serbanescu ....................... 455/1 |

FOREIGN PATENT DOCUMENTS

EP    0 899 682 A2    3/1999
FR    2 831 305 A1    4/2003

* cited by examiner

*Primary Examiner* — Lewis West
(74) *Attorney, Agent, or Firm* — Panitch Schwarze Belisario & Nadel LLP

(57) ABSTRACT

A contactless data transmission device includes an antenna circuit supplying an alternating voltage in the presence of an alternating excitation field, a charge modulation transistor having a control terminal receiving a charge modulation signal having at least one low state and one high state, and a conduction terminal receiving the alternating voltage. The device includes a circuit for supplying a boosted direct voltage greater than a peak value of the alternating voltage supplied by the antenna circuit, and a circuit for applying to the control terminal of the charge modulation transistor a charge modulation signal which, in the high state, has a voltage level equal to the boosted direct voltage.

19 Claims, 7 Drawing Sheets

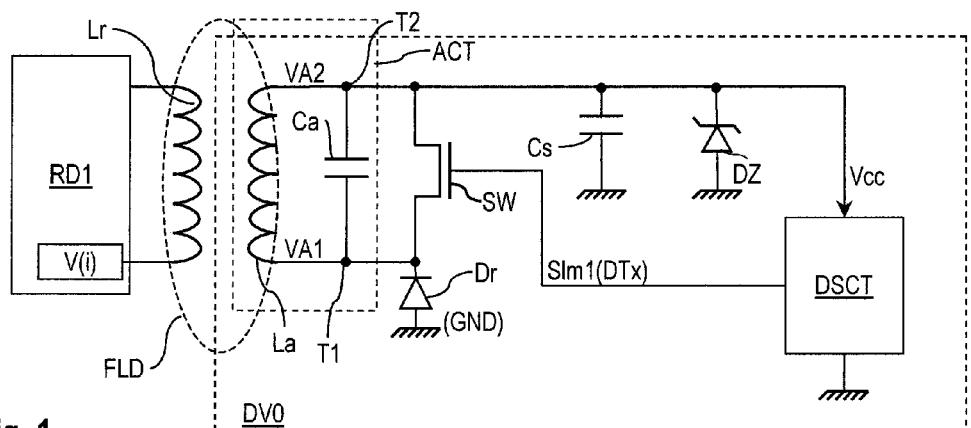
Fig. 1
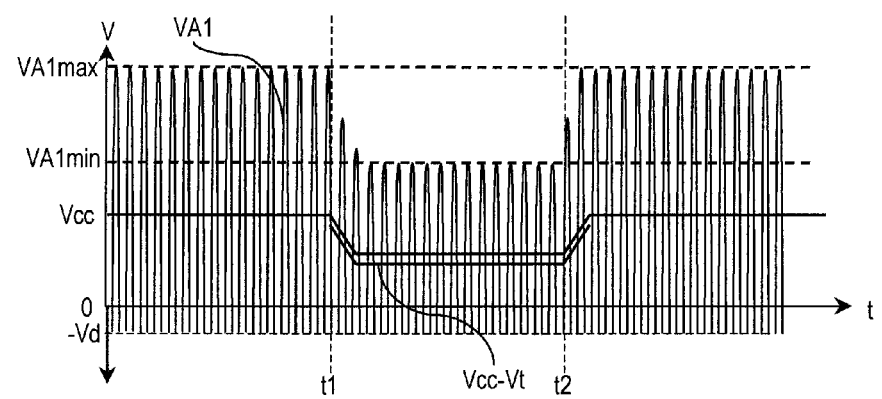
Fig. 2A
Fig. 2B
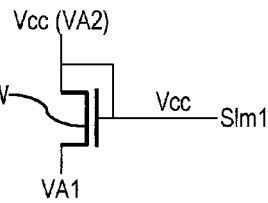
Fig. 3
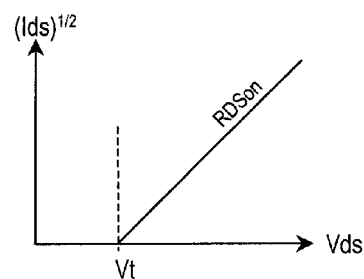
Fig. 4

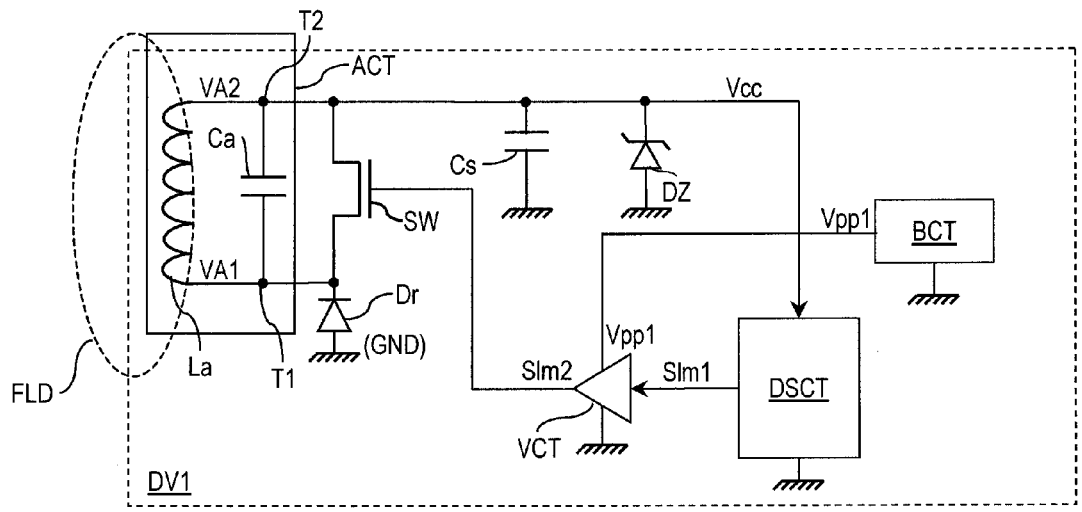
Fig. 5
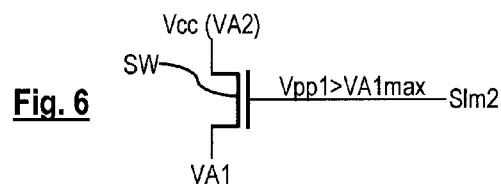
Fig. 6
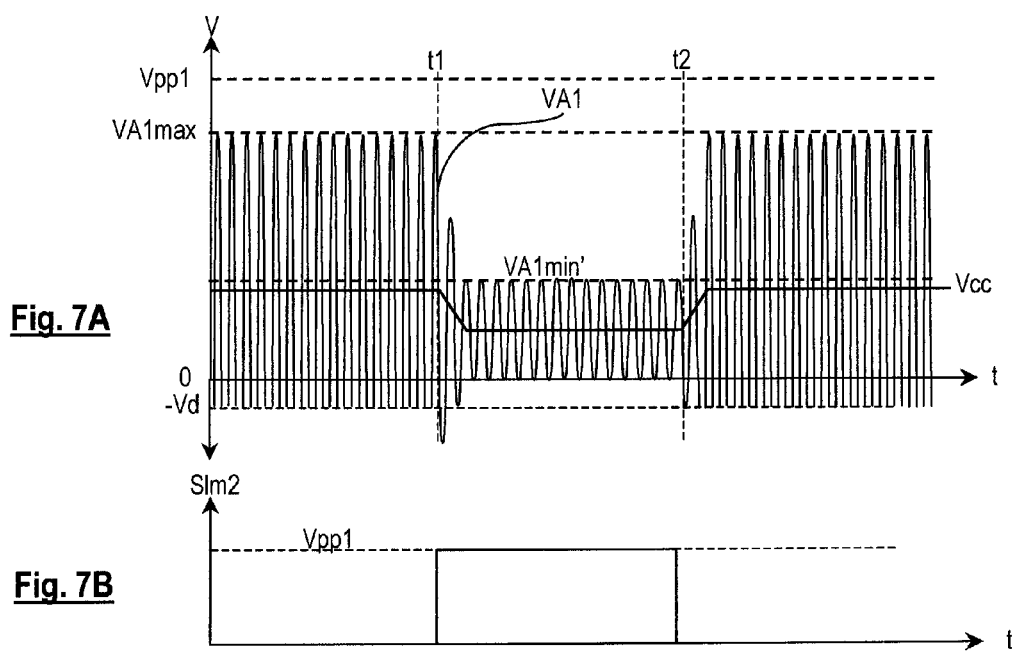
Fig. 7A
Fig. 7B

METHOD AND DEVICE FOR TRANSMITTING DATA BY CHARGE MODULATION

CROSS-REFERENCE TO RELATED APPLICATIONS

This application is a Section 371 of International Application No. PCT/IB2007/001139, filed May 2, 2007, which was published in the French language on Nov. 15, 2007, under International Publication No. WO 2007/129187, and the disclosure of which is incorporated herein by reference.

BACKGROUND OF THE INVENTION

Embodiments of the present invention relate to a method of transmitting data by charge modulation, and a device for transmitting data implementing this method.

Embodiments of the present invention particularly relate to devices for the contactless transmission of data by inductive coupling, or Radio Frequency Identification devices (RFID), such as those described by the standards ISO/IEC 14443 and ISO/IEC 15693. Embodiments of the present invention particularly relate to contactless data transmission devices of passive type, which are able to extract a supply voltage from an alternating signal supplied by the antenna circuit thereof.

FIG. 1 is a conventional base diagram of a contactless data transmission device DV0 of passive type, provided for emitting data by inductive coupling and charge modulation. For simplicity, such a device will be hereinafter referred to as a "contactless device". The device DV0 includes a tuned antenna circuit ACT, a charge modulation transistor SW, and a data transmission circuit DSCT. The antenna circuit ACT includes an antenna coil La and a capacitor Ca in parallel with the antenna coil.

The charge modulation transistor SW, here a MOS transistor, has a first conduction terminal (source) connected to a terminal T1 of the antenna circuit ACT and a second conduction terminal (drain) connected to a terminal T2 of the antenna circuit ACT. A rectifying diode Dr is connected between the terminal T1 and the ground GND of the device. A smoothing capacitor Cs and a Zener diode DZ in parallel are connected between the terminal T2 of the antenna circuit ACT and the ground GND.

The contactless device DV0 is activated by a magnetic field FLD oscillating at a working frequency equal to or near a tuning frequency of the antenna circuit ACT. The magnetic field FLD is, for example, emitted by a reader RD1, which is equipped to that end with an antenna coil Lr and applies thereto an excitation signal oscillating at the working frequency. This working frequency is, for example, 13.56 MegaHertz (MHz) in a device complying with one of the aforementioned ISO standards.

By inductive coupling, an alternating antenna signal appears in the antenna coil La of the device DV0. This antenna signal makes a signal VA1 appear on the terminal T1 of the antenna circuit ACT and a signal VA2 appear on the terminal T2 of the antenna circuit ACT.

With reference to the ground GND of the device DV0, the signal VA1 is a half-wave rectified alternating signal and the signal VA2 is a nearly direct signal smoothed by the capacitor Cs and clipped by the diode DZ, for example near 5 Volts (V). The contactless device DV0 is here assumed to be purely passive, and the rectified signal VA1 is used as direct supply voltage Vcc of the data transmission circuit DSCT.

Such a base architecture of a contactless device allows various contactless electronic portable objects to be made, such as contactless chip cards, contactless identification badges, electronic tags, or the like.

To send data DTx to the reader RD1, the data transmission circuit DSCT applies to the transistor SW a binary charge modulation signal Slm1, which is generated according to the data DTx, which is generally coded according to a predetermined coding protocol (NRZ, Manchester, BPSK, or the like). When the signal Slm1 is at "1", it is equal or substantially equal to the voltage Vcc (ignoring the loss in commutation elements internal to the data transmission circuit DSCT). The transistor SW is then conductive and has a determined series resistor (drain-source resistor RDson). The antenna circuit ACT is therefore short-circuited by the resistor RDson, which is typically set at about several hundred Ohms. The effect of the short-circuit (in actuality a partial short-circuit since the series resistor is not equal to zero) is to modulate the impedance of the antenna circuit ACT, and the modulation of impedance passes on in the antenna signal of the reader RD1 by inductive coupling. The reader may thus, thanks to an adapted filtering circuit, extract the modulation signal from its own antenna signal and deduce therefrom, after demodulation and decoding, the data DTx sent by the device DV0.

FIG. 2A shows the shape of the signal VA1 when the transistor SW is blocked, and the shape of the signal VA1 when the transistor SW is conductive, during a charge modulation period spreading between two instants t1 and t2. The supply voltage Vcc signal is also shown. FIG. 2B shows the shape of the charge modulation signal Slm1, which is at 1 (Vcc, high state) between the instants t1 and t2 and at 0 (ground, low state) outside of the charge modulation periods. Outside of the charge modulation periods, the amplitude of the signal VA1 is at a maximum and the signal VA1 oscillates between a peak value VA1max and a negative minimal value −Vd, which is equal in absolute value to the threshold voltage Vd of the rectifying diode Dr. The supply voltage Vcc is also at a maximum. During the charge modulation period spreading between the instants t1 and t2, the peak value of the signal VA1 decreases substantially and does not exceed a value VA1min, while the supply voltage Vcc also decreases. Both phenomena are caused by the modification of the amplitude of the magnetic field FLD, caused by the modification of the impedance of the antenna circuit of the reader RD1 in response to the short-circuit applied to the antenna circuit ACT of the device DV0.

The advantage of this structure of contactless device is that the charge modulation depth (i.e., amplitude), that is, the difference between the amplitudes VA1max and VA1min of the alternating signal VA1, is relatively low and preserves the reception of electrical energy during the modulation periods.

This advantage has however proven to become a drawback in applications where a greater charge modulation depth is desired in order to increase the communication distance between the reader RD1 and the contactless device DV0. Indeed, the amplitude of the charge modulation signal detected by the reader RD1 is also a function of the distance between the reader RD1 and the contactless device DV0: the longer the communication distance, the poorer the image of the charge modulation signal mixed to the antenna signal of the reader, because the inductive coupling is lower. In these conditions, the communication distance may only be increased by increasing the depth of charge modulation. To measure the impact of charge modulation in the reader, the variation of the antenna current i in the reader is measured, choosing a determined distance between the reader and the device. Measuring current variation is performed using a series resistor giving a voltage V(i). If a variation of minimal voltage V(i)min is not reached, the modulation depth is considered to be insufficient.

It is therefore desirable to allow the charge modulation depth to be increased without penalizing in an unacceptable way the reception of energy, which is necessary to supply the supply voltage Vcc to a purely passive contactless device or to supply an auxiliary supply voltage to a semi-passive contactless device.

BRIEF SUMMARY OF THE INVENTION

A contactless data transmission device is provided having an antenna circuit supplying an alternating voltage in the presence of an alternating excitation field. A charge modulation transistor includes a control terminal receiving a charge modulation signal having at least one low state and one high state. A conduction terminal receives the alternating voltage. The device includes a circuit for supplying a boosted direct voltage greater than a peak value of the alternating voltage supplied by the antenna circuit, and a circuit for applying to the control terminal of the charge modulation transistor a charge modulation signal which, in the high state, has a voltage level equal to the boosted direct voltage.

According to one embodiment, the device includes a booster circuit for supplying the boosted direct voltage from the alternating voltage supplied by the antenna circuit.

According to another embodiment, the device includes a circuit for producing an unboosted direct voltage from the alternating voltage supplied by the antenna circuit and a booster circuit for supplying the boosted direct voltage from the not boosted direct voltage.

According to a further embodiment, the device includes a voltage adaptation circuit for transforming a first charge modulation signal which, in the high state, has an unboosted voltage level, and in a second charge modulation signal which, in the high state, has a voltage level equal to the boosted direct voltage.

According to another embodiment, the booster circuit includes at least one charge pump stage.

According to a further embodiment, the charge pump also supplies a voltage for erasing or programming an electrically erasable and programmable memory.

According to another embodiment, the charge pump receives as pumping signal the alternating voltage supplied by the antenna circuit.

According to a further embodiment, the charge modulation transistor is a MOS transistor.

According to another embodiment, the antenna circuit includes an antenna coil, which supplies the alternating voltage in the presence of an alternating magnetic field.

According to a further embodiment, a first terminal of the antenna circuit is connected to a first terminal of a rectifying diode, and a second terminal of the rectifying diode receives a reference potential. A second terminal of the antenna circuit is connected to a first terminal of a smoothing capacitor and a second terminal of the smoothing capacitor receives the reference potential. The alternating voltage is present on the first terminal of the antenna circuit, and the second terminal of the antenna circuit has a rectified voltage in relation to the reference potential. The modulation transistor receives the rectified voltage on a first conduction terminal and the alternating voltage on a second conduction terminal.

Embodiments of the invention also relate to an electronic portable object, in particular chip cards or electronic tags, including a device as described above.

A contactless data transmission method by charge modulation includes providing an antenna circuit supplying an alternating voltage in the presence of an alternating excitation field, providing a charge modulation transistor having a conduction terminal linked to a terminal of the antenna circuit and receiving the alternating voltage supplied by the antenna circuit, producing a boosted direct voltage greater than the peak value of the alternating voltage, and applying to a control terminal of the charge modulation transistor a charge modulation signal having at least one low state and one high state. In the high state, the voltage level is equal to the boosted direct voltage.

According to one embodiment, the boosted direct voltage is produced from the alternating voltage supplied by the antenna circuit.

According to another embodiment, the boosted direct voltage is produced from another boosted direct voltage produced from the alternating voltage supplied by the antenna circuit.

According to a further embodiment, the method includes supplying a first charge modulation signal which, in the high state, has another boosted voltage level, transforming the first charge modulation signal in a second charge modulation signal which, in the high state, has a voltage level equal to the boosted direct voltage, and applying the second charge modulation signal to the control terminal of the modulation transistor.

According to another embodiment, at least one charge pump stage is used to produce the boosted voltage.

According to a further embodiment, the charge pump is also used to produce a voltage for erasing or programming an electrically erasable and programmable memory.

According to another embodiment, the alternating voltage supplied by the antenna circuit is used as a pumping signal of the charge pump.

According to another embodiment, a MOS transistor is used as charge modulation transistor.

According to another embodiment, the antenna circuit includes an antenna coil that supplies the alternating voltage in the presence of an alternating magnetic field.

According to a further embodiment, the method includes connecting a first terminal of the antenna circuit to a first terminal of a rectifying diode, applying a reference potential to a second terminal of the rectifying diode, and connecting a second terminal of the antenna circuit to a first terminal of a smoothing capacitor, applying the reference potential to a second terminal of the smoothing capacitor, so that the alternating voltage appears on the first terminal of the antenna circuit and that a rectified voltage in relation to the reference potential appears on the second terminal of the antenna circuit. The rectified voltage is applied to a first conduction terminal of the modulation transistor and the alternating voltage is applied to a second conduction terminal of the transistor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 shows a conventional structure of a contactless data transmission device;

FIG. 2A shows signals appearing in the device of FIG. 1 in the presence of an alternating excitation signal;

FIG. 2B shows a conventional charge modulation signal;

FIG. 3 is a diagram of the charge modulation switch during charge modulation periods;

FIG. 4 shows the transconductance function of the charge modulation switch of FIG. 3;

FIG. 5 shows the general structure of a contactless data transmission device according to preferred embodiments of the invention;

FIG. 6 is a diagram of a charge modulation switch present in the device of FIG. 5 during charge modulation periods;

FIG. 7A shows signals appearing in the device of FIG. 5 in the presence of an alternating excitation field;

FIG. 7B shows a charge modulation signal according to preferred embodiments of the invention;

DETAILED DESCRIPTION OF THE INVENTION

Figure 8:
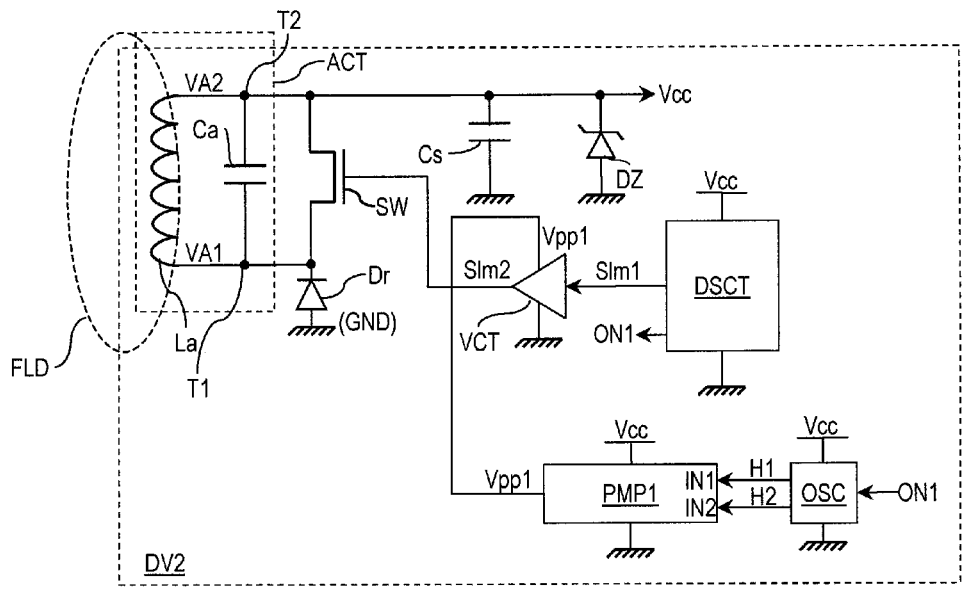
FIG. 8 shows a first embodiment of the device of FIG. 5.

Embodiments of the present invention are based on an analysis of the charge modulation mechanism by the transistor SW configured as shown in FIG. 1. FIG. 3 is a diagram of the transistor SW during the charge modulation period, when the charge modulation signal Slm1 is equal to 1, i.e. the voltage Vcc (FIG. 2B). The transistor SW receives the voltage Vcc on the control terminal thereof, here the gate terminal thereof, and also receives the voltage Vcc (VA2) on a conduction terminal, here the drain terminal thereof, while the source terminal thereof receives the half rectified alternating voltage VA1, the shape of which is shown in FIG. 2A. It thus appears that the gate terminal of the transistor is brought to the same potential as the drain terminal thereof. The diagram of the transistor in FIG. 3 thus includes a wire linking the gate terminal and the drain terminal. The transistor operates like a diode (saturation operating conditions) and the transconductance function thereof is as shown in FIG. 4, where Vds is the drain-source voltage of the transistor, Ids is the drain-source current crossing the transistor, Vt is the threshold voltage of the transistor, and RDSon is the drain-source resistance thereof in the conductive state. For the transistor to be conductive, the following condition must be reached:

$$Vcc - Vt > VA1$$

or:

$$VA1 < Vcc - Vt$$

Thus, the transistor SW is conductive when the alternating voltage is lower than Vcc−Vt and is otherwise non-conductive. The effective charge modulation area is therefore reduced and spreads between the curve Vcc−Vt shown in FIG. 2A and the straight line −Vd. In other words, when the signal VA1 varies between −Vd and VA1min, the charge modulation transistor SW is conductive when VA1 is lower than Vcc−Vt, and is non-conductive when VA1 becomes greater than Vcc−Vt, and is then conductive again when VA1 becomes lower than Vcc−Vt, and so on. A rapid alternation between the conductive state and the non-conductive state of the transistor is therefore observed.

To obtain a greater charge modulation depth without penalizing the reception of energy, embodiments of the present invention suggest applying to the gate terminal of the transistor SW a direct voltage that is greater than the maximum peak voltage VA1max of the alternating voltage VA1. In these conditions, the transistor SW is no longer configured as a diode and is continually conductive during the charge modulation periods.

FIG. 5 shows a contactless data transmission device DV1 according to the invention. The device DV1 includes all of the elements of the device DV0 described hereinbefore, designated by the same references. The device DV1 thus includes the antenna circuit ACT comprising the coil La and the capacitor Ca, the rectifying diode Dr linked to the terminal T1 of the antenna circuit ACT, the smoothing capacitor Cs and the clipping diode DZ linked to the terminal T2 of the antenna circuit ACT, the charge modulation transistor SW connected between the terminals T1 and T2, as well as the data transmission circuit DSCT powered by the nearly direct voltage VA2 present on the terminal T2, used as supply voltage Vcc. It is assumed here and in FIGS. 8, 10, 12, and 14 described hereinafter, that the device according to embodiments of the invention is in the presence of an alternating magnetic field FLD emitted by the reader RD1 shown in FIG. 1, which has not been illustrated again in these drawings.

According to preferred embodiments of the invention, the device DV1 also includes a booster circuit BCT and a voltage adaptation circuit VCT. The booster circuit BCT supplies a voltage Vpp1 that is greater than the peak value VA1max that the signal VA1 may attain outside of the charge modulation periods. The voltage adaptation circuit VCT is powered by the voltage Vpp1 and receives the charge modulation signal Slm1 supplied by the data transmission circuit DSCT. As indicated hereinbefore, the high level of the signal Slm1 substantially corresponds to the voltage Vcc (ignoring the loss in commutation elements of the data transmission circuit DSCT). The voltage adaptation circuit VCT converts the signal Slm1 into a charge modulation signal Slm2. The voltage adaptation circuit VCT may be one of any known type of voltage adapter, for example, a follower amplifier, a logic gate powered by the voltage Vpp1, a trigger or a bistable powered by the voltage Vpp1, or the like.

Thus, the signal Slm2 is the image of the signal Slm1 but the high level of this signal is formed by the voltage Vpp1 and not by the voltage Vcc. The low level of the signal Slm2 is preferably identical to the low level of the signal Slm1, and is here the ground potential (GND). The transistor SW is thus in linear operating conditions, as shown in FIG. 6, and its gate voltage Vpp1 is always greater than its drain-source voltage (Vcc−VA1). The transistor SW is thus continually conductive when the signal Slm2 is equal to 1 (Vpp1).

FIG. 7A shows the aspect of the signal VA1 and the voltage Vcc during a charge modulation period spreading between the instants t1 and t2, and FIG. 7B shows the shape of the signal Slm2, equal to Vpp1 between the instants t1 and t2. By comparing FIG. 7A and FIG. 2A, it appears that the alternating signal VA1 oscillates between the threshold voltage of the diode −Vd and a peak voltage VA1min', which is clearly lower than the peak voltage VA1min of FIG. 2A. However, and against all expectations, the reception of energy is slightly affected by the increase of the charge modulation depth, and the supply voltage Vcc is subjected to a decrease, which is much the same as the decrease shown in FIG. 2A, for identical consumed current (FIGS. 2A and 7A show the case where the electrical energy consumed on the supply line carrying the voltage Vcc is lower than the energy extracted, the voltage Vcc reaching a lower plateau). This surprising result which apparently contradicts the increase of the charge modulation depth, may be explained, in simple terms, by the fact that the electrical energy is sent by the transistor SW to the terminal T2 of the antenna circuit ACT (terminal supplying Vcc) when the amplitude of the signal AC1 is greater than Vcc−Vt. The transistor SW is conductive instead of being non-conductive. Indeed, during the charge modulation periods, the charge modulation transistor SW no longer operates as a diode and is equivalent to a resistor.

In practice, the voltage Vpp1 supplied by the booster circuit BCT may be produced: 1) by boosting a voltage supplied by a local voltage source, such as an electrical battery, if the device is of the semi-autonomous type (semi-passive); or 2) by boosting the voltage Vcc or one of the signals VA1, VA2 supplied by the antenna circuit ACT, if the device is of the completely passive type, knowing that the signal VA2 may be alternating if the rectification is not performed at the terminals of the antenna circuit ACT (for example in the case of a full-wave rectification performed by diode bridge).

Embodiments of contactless devices DV2, DV3, DV4, DV5 of purely passive type, shown in FIGS. 8, 10, 12 and 14, respectively, will be described hereinafter.

The contactless device DV2 shown in FIG. 8 includes a charge pump PMP1 for supplying the voltage Vpp1 to the voltage adaptation circuit VCT. The charge pump PMP1 is powered by the voltage Vcc and receives on inputs IN1, IN2 two pumping signals in opposite phase supplied by an oscillator OSC. The oscillator OSC is preferably of very simple and low cost manufacture. It is, for example, a ring oscillator, formed by an odd number of inverting gates in chain, with the output of the last gate being brought to the input of the first gate. The oscillator OSC is activated by a signal ON1 supplied by the data transmission circuit DSCT when the modulation signal Slm2 must be applied to the modulation switch SW.

Figure 9:
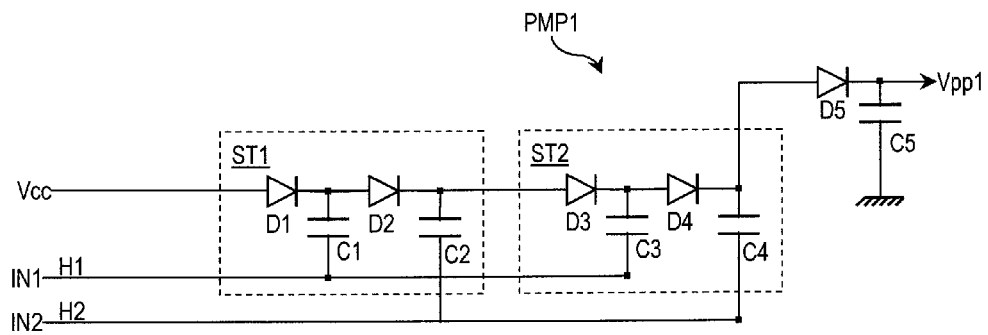
FIG. 9 shows the structure of a charge pump present in the device of FIG. 8.

As shown in FIG. 9 the charge pump PMP1 for example includes two pumping stages ST1, ST2 in chain and an output stage having a diode D5 and a capacitor C5. The stage ST1 includes two diodes D1, D2 and two capacitors C1, C2. The stage ST2 includes two diodes D3, D4 and two capacitors C3, C4. The diode D1 receives the voltage Vcc on the anode thereof and the cathode thereof is connected to the anode of the capacitor C1 and the anode of the diode D2. The cathode of the diode D2 is connected to the anode of the capacitor C2 and the anode of the diode D3. The cathode of the diode D3 is connected to the anode of the capacitor C3 and the anode of the diode D4. The cathode of the diode D4 is connected to the anode of the capacitor C4 and the anode of the diode D5. The cathode of the diode D5 is connected to the anode of the capacitor C5 and supplies the voltage Vpp1. The cathode of the capacitor C5 is connected to the ground, the cathodes of the capacitors C1, C3 receive the pumping signal H1 and the cathodes of the capacitors C2, C4 receive the pumping signal H2.

The voltage Vpp1 is, for example, from 12 to 13 V for a voltage Vcc of 5 V and pumping signals having a high level of 5 V and a low level of 0 V.

Figure 10:
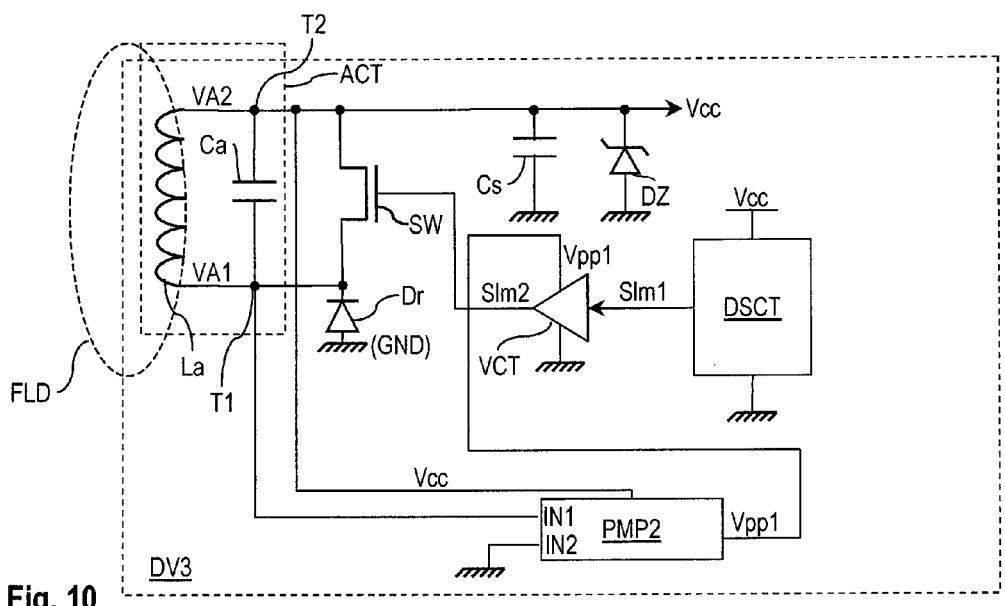
FIG. 10 shows a second embodiment of the device of FIG. 5.

The contactless device DV3 shown in FIG. 10 includes a charge pump PMP2 for supplying the voltage Vpp1 to the voltage adaptation circuit VCT. The charge pump PMP2 is powered by the voltage Vcc and receives at an input IN1 the half-wave alternating signal VA1 taken from the terminal T1 of the antenna circuit ACT, while the other pumping input IN2 thereof is connected to the ground.

Figure 11:
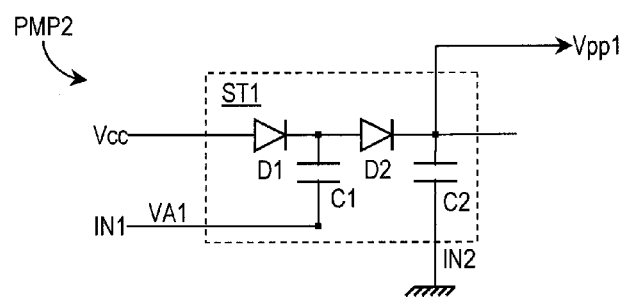
FIG. 11 shows the structure of a charge pump present in the device of FIG. 10.

The charge pump PMP2 is, for example, constructed as shown in FIG. 11. It includes only a simple pumping stage ST1 identical to that of the charge pump PMP1. The diode D1 receives the voltage Vcc on the anode thereof and the cathode thereof is connected to the anode of the capacitor C1 and the anode of the diode D2. The cathode of the diode D2 is connected to the anode of the capacitor C2 and supplies the voltage Vpp1. The cathode of the capacitor C1 receives the alternating signal VA1 and the cathode of the capacitor C2 is connected to the ground. The voltage Vpp1 is for example from 12 to 13 V for a voltage Vcc of 5 V and a pumping signal VA1 having an amplitude of around 8 to 10 V.

Figure 12:
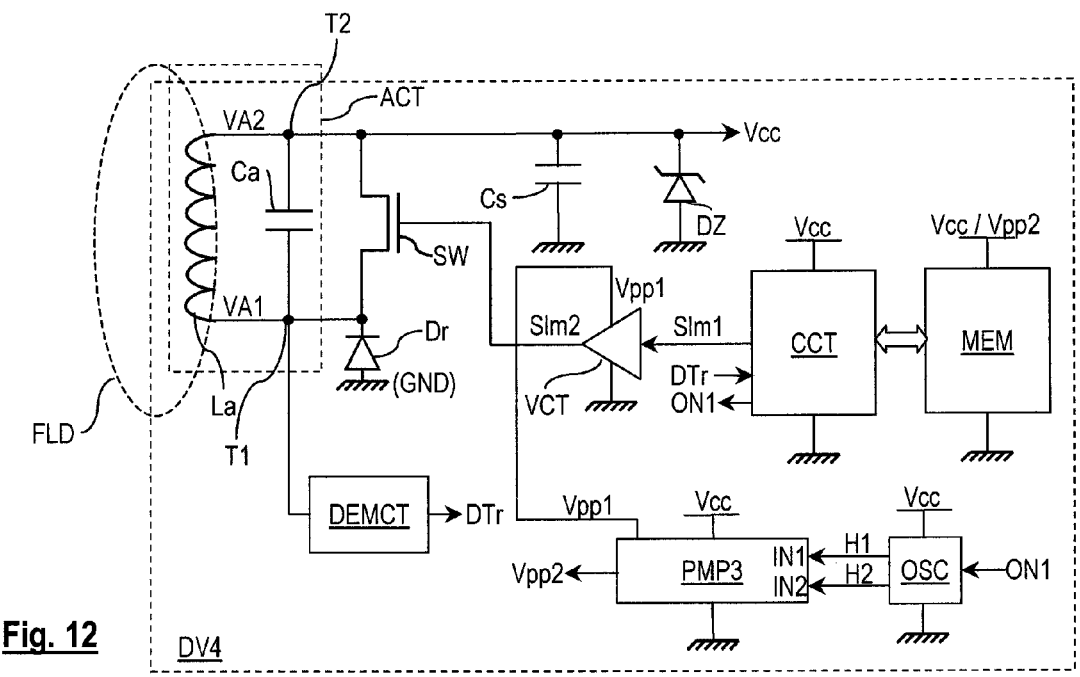
FIG. 12 shows a third embodiment of the device of FIG. 5.

The contactless device DV4 shown in FIG. 12 includes, instead of the data transmission circuit DSCT, a microprocessor or wired-logic control circuit CCT provided for executing high level commands sent by the reader RD1 (compare with FIG. 1). The control circuit CCT is equipped with an electrically erasable and programmable memory (EEPROM) MEM and the commands are, for example, commands for writing or reading the memory, anti-collision commands, identification commands, or the like. The device DV4 also includes a demodulation circuit DEMCT having an input connected to the terminal T1 of the antenna circuit ACT, and an output supplying data DTr sent by the reader RD1 by modulating the amplitude of the magnetic field FLD. The data DTr is extracted from the alternating signal VA1 by a filtering circuit present in the demodulator DEMCT and allowing the envelope of this signal to be extracted by suppressing the carrier of the magnetic field. The data DTr is then decoded by the control circuit CCT. The data DTr forms the aforementioned commands and may comprise application data to be processed, in particular data to be written to the memory MEM.

A charge pump PMP3 is provided for supplying a high voltage Vpp2, for erasing and programming the memory MEM, of around 12 V to 15 V. The charge pump PMP3 receives, at inputs IN1, IN2, pumping signals H1, H2 supplied by an oscillator OSC similar to that described hereinbefore, activated by a signal ON1 supplied by the control circuit CCT. Advantageously, the charge pump PMP3 is also used to supply the voltage Vpp1 of the charge modulation signal Slm2.

Figure 13:
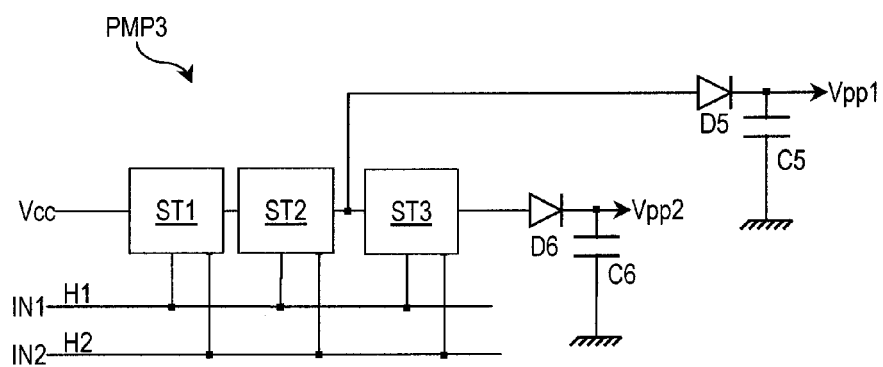
FIG. 13 shows the structure of a charge pump present in the device of FIG. 12.

As shown in FIG. 13, the charge pump PMP3 for example includes three pumping stages ST1, ST2 ST3 in chain. A first output stage includes a diode D5 and a capacitor C5 and a second output stage includes a diode D6 and a capacitor C6. The stages ST1, ST2 and the first output stage are arranged as described in relation with FIG. 9 and form the equivalent of the pump PMP1, wherein the cathode of the diode D5 supplies the voltage Vpp1. The stage ST3 is arranged in chain with the stage ST2 and the output thereof is linked to the anode of the diode D6, the cathode of which supplies the voltage Vpp2 and is linked to the anode of the capacitor C6, the cathode of which is linked to the ground.

Figure 14:
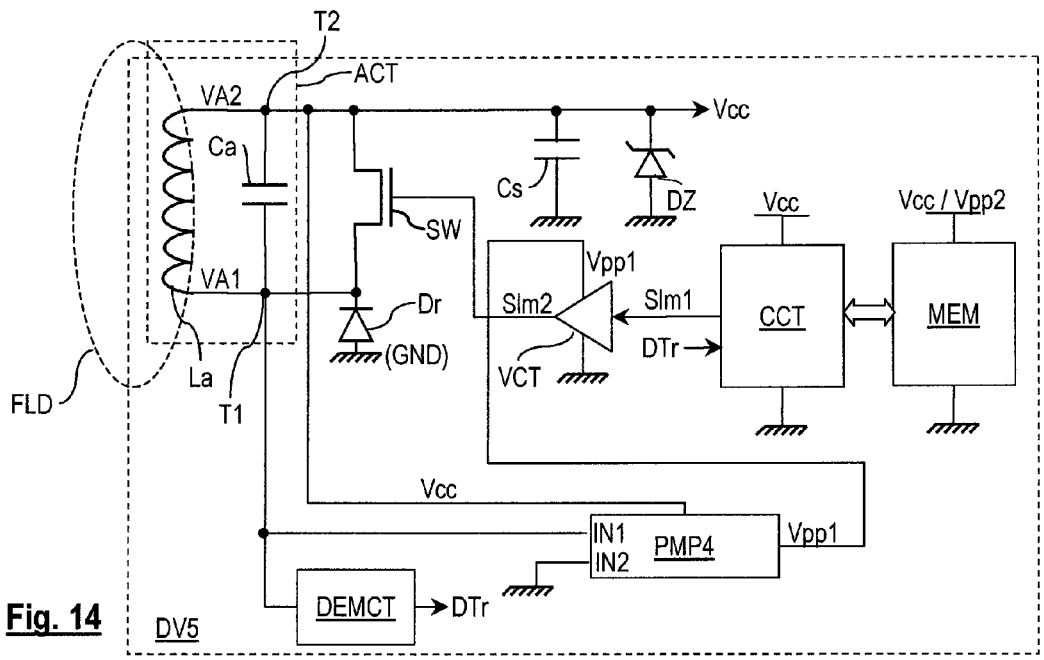
FIG. 14 shows a fourth embodiment of the device of FIG. 5.
Figure 15:
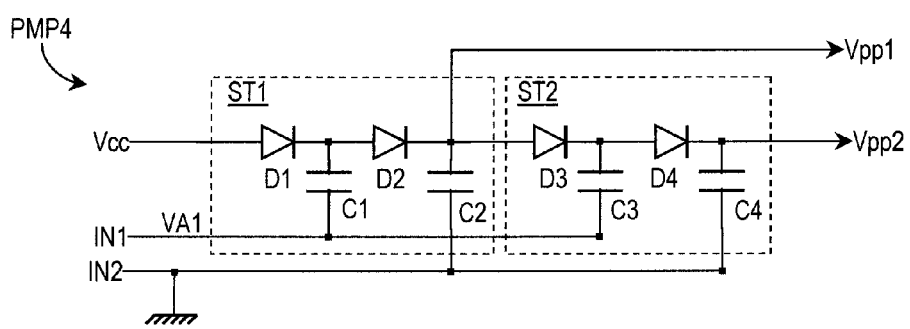
FIG. 15 shows the structure of a charge pump present in the device of FIG. 14.

The contactless device DV5 shown in FIG. 14 is similar to the device DV4 and only differs therefrom in that it includes a charge pump PMP4 receiving as a pumping signal the alternating signal VA1 taken from the terminal T1 of the antenna circuit ACT. The signal VA1 is applied to an input IN1 of the charge pump PMP4 and an input IN2 of the charge pump PMP4 is connected to the ground.

The charge pump PMP4 includes two pumping stages in chain ST1, ST2, here activated like the pumping stage ST1 of the charge pump PMP2 (FIG. 11). Thus, in the stage ST1, the diode D1 receives the voltage Vcc on the anode thereof and the cathode thereof is connected to the anode of the capacitor C1 and the anode of the diode D2. The cathode of the diode D2 is connected to the anode of the capacitor C2 and supplies the voltage Vpp1. The cathode of the capacitor C1 receives the alternating signal VA1 and the cathode of the capacitor C2 is connected to the ground. In the stage ST2, the anode of the diode D3 is connected to the cathode of the diode D2 of the stage ST1 and receives the voltage Vpp1. The cathode of the diode D3 is connected to the anode of the capacitor C3 and the anode of the diode D4. The cathode of the diode D4 is connected to the anode of the capacitor C4 and supplies the voltage Vpp2. The cathode of the capacitor C3 receives the alternating signal VA1 and the cathode of the capacitor C2 is connected to the ground.

It will be clear to those skilled in the art that embodiments of the present invention are capable of being arranged in various other configurations.

In particular, if the signals VA1, VA2 are both alternating (full-wave rectification by diode bridge), pumping charges may be performed using both signals as pumping signals H1, H2 and connecting the input of the charge pump to the ground.

In addition, the charge modulation transistor may have a very low intrinsic series resistor, or at least too low to sufficiently modulate the charge of the antenna circuit. In this case, a load impedance (resistor, capacitor, or the like) may be arranged in series with the modulation transistor. This load impedance performs the modulation of the charge of the antenna circuit when the charge modulation transistor is conductive, the latter being utilized as a simple switch.

The voltage adaptation circuit VCT may also be an inverting circuit. In this case, the signal Slm2 is the inverted image of the signal Slm1 and is at high level, i.e., the voltage Vpp1, when the signal Slm1 is at low level.

Embodiments of the present invention are also susceptible of various applications. The devices DV2, DV3 are purely transmitting devices and make it possible to manufacture contactless portable objects of tag or identification type, transmitting according to determined time intervals data inscribed in the data transmission circuit DSCT. The devices DV4, DV5 are able to receive and execute commands for writing and reading the memory thereof and allow various contactless portable objects to be made such as contactless chip cards, contactless electronic badges, contactless electronic tags, etc. The various elements constituting the devices DV1 to DV5 are generally integrated into a semiconductor chip, except for the antenna coil, which is usually arranged in or on the support receiving the semiconductor chip, or is arranged on the actual chip ("coil on chip").

Figure 16:
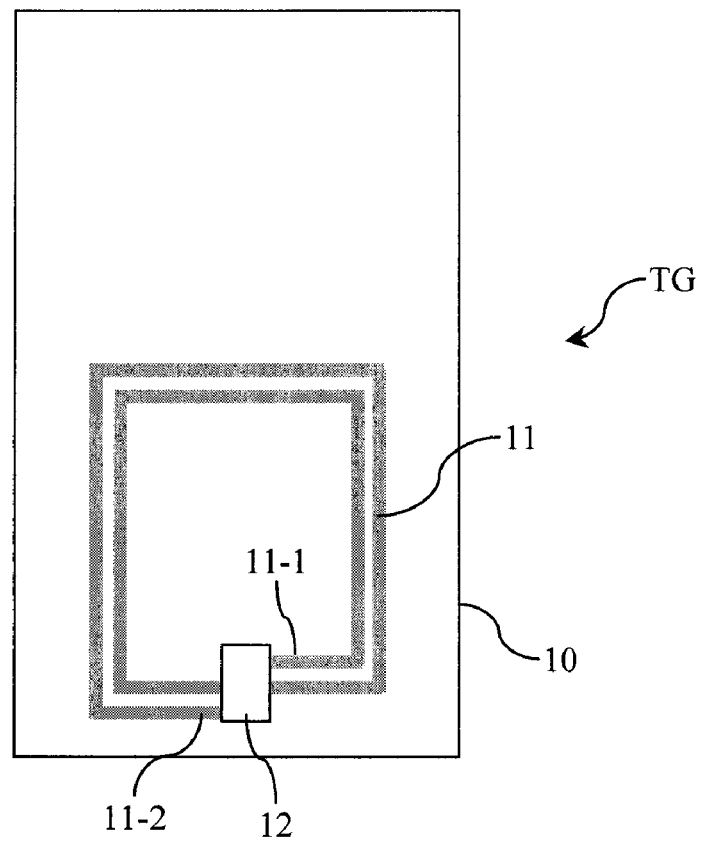
FIG. 16 shows a portable object equipped with a contactless data transmission device according to preferred embodiments of the invention.

By way of example, FIG. 16 shows an electronic tag TG includes a substrate 10 in an insulating material (paper, plastic sheet, or the like), an antenna coil 11, and a semiconductor chip 12 integrating the constitutive elements of one of the devices DV1 to DV5. The antenna coil 11 is made by inkjet or by etching a conductive material. The internal face of the chip 12 includes electric contacts (not shown) that are connected to ends 11-1, 11-2 of the antenna coil.

Embodiments of the present invention are not limited to inductive coupling circuits and may globally be applied to any device equipped with an antenna circuit and receiving an induced alternating signal allowing a supply voltage to be produced. Embodiments of the present invention particularly apply to electric coupling contactless circuits having an antenna circuit designed to receive an electric field UHF and modulate the impedance of the antenna circuit thereof, to modulate the reflection coefficient thereof, when data is transmitted.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A contactless data transmission device comprising:
   an antenna circuit supplying an alternating voltage in the presence of an alternating excitation field;
   a charge modulation transistor having a control terminal receiving a charge modulation signal having at least one low state and one high state, and a conduction terminal receiving the alternating voltage;
   a rectifier circuit for producing, from the alternating voltage, an unboosted direct voltage, and a control circuit electrically powered by the unboosted direct voltage, for supplying a first charge modulation signal which, in the high state, has an unboosted voltage level; and
   a booster circuit for supplying a boosted direct voltage greater than a peak value of the alternating voltage, the booster circuit comprising a voltage adaptation circuit for transforming the first charge modulation signal into a second charge modulation signal which, in the high state, has a voltage level equal to the boosted direct voltage, the second charge modulation signal being applied to the control terminal of the charge modulation transistor.

2. The device according to claim 1, wherein the booster circuit supplies the boosted direct voltage from the alternating voltage supplied by the antenna circuit.

3. The device according to claim 1, wherein the booster circuit supplies the boosted direct voltage from the unboosted direct voltage.

4. The device according to claim 2, wherein the booster circuit comprises at least one charge pump stage.

5. The device according to claim 4, wherein the charge pump supplies a voltage for erasing or programming an electrically erasable and programmable memory.

6. The device according to claim 4, wherein the charge pump receives as a pumping signal the alternating voltage supplied by the antenna circuit.

7. The device according to claim 1, wherein the charge modulation transistor is a MOS transistor.

8. The device according to claim 1, wherein the antenna circuit comprises an antenna coil that supplies the alternating voltage in the presence of an alternating magnetic field.

9. The device according to claim 1, wherein:
   a first terminal of the antenna circuit is connected to a first terminal of a rectifying diode, a second terminal of the rectifying diode receiving a reference potential,
   a second terminal of the antenna circuit is connected to a first terminal of a smoothing capacitor, a second terminal of the smoothing capacitor receiving the reference potential,
   the alternating voltage is present on the first terminal of the antenna circuit,
   the second terminal of the antenna circuit has a rectified voltage in relation to the reference potential, and
   the modulation transistor receives the rectified voltage on a first conduction terminal and the alternating voltage on a second conduction terminal.

10. An electronic portable object comprising a device according to claim 1.

11. The electronic portable object of claim 10, wherein the electronic portable object is one of a chip card and an electronic tag.

12. A contactless data transmission method by inductive coupling and charge modulation, the method comprising:
  providing an antenna circuit supplying an alternating voltage in the presence of an alternating excitation field;
  providing a charge modulation transistor having a control terminal for receiving a charge modulation signal having at least one low state and one high state, and a conduction terminal linked to a terminal of the antenna circuit and receiving the alternating voltage supplied by the antenna circuit;
  providing a rectifier circuit for producing, from the alternating voltage, an unboosted direct voltage;
  providing a control circuit electrically powered by the unboosted direct voltage, for supplying a first charge modulation signal which, in the high state, has an unboosted voltage level;
  producing a boosted direct voltage greater than the peak value of the alternating voltage;
  transforming the first charge modulation signal into a second charge modulation signal which, in the high state, has a voltage level equal to the boosted direct voltage; and
  applying the second charge modulation signal to the control terminal of the modulation transistor.

13. The method according to claim 12, wherein the boosted direct voltage is produced from the alternating voltage supplied by the antenna circuit.

14. The method according to claim 13, wherein the boosted direct voltage is produced from the unboosted direct voltage.

15. The method according to claim 12, wherein at least one charge pump stage produces the boosted voltage.

16. The method according to claim 15, wherein the charge pump produces a voltage for erasing or programming an electrically erasable and programmable memory.

17. The method according to claim 15, wherein the alternating voltage supplied by the antenna circuit is supplied as a pumping signal of the charge pump.

18. The method according to claim 12, wherein the charge modulation transistor is a metal-oxide-semiconductor (MOS) transistor.

19. The method according to claim 12, further comprising:
  connecting a first terminal of the antenna circuit to a first terminal of a rectifying diode;
  applying a reference potential to
  a second terminal of the rectifying diode;
  connecting a second terminal of the antenna circuit to a first terminal of a smoothing capacitor;
    applying the reference potential to a second terminal of the smoothing capacitor so that the alternating voltage appears on the first terminal of the antenna circuit and a rectified voltage in relation to the reference potential appears on the second terminal of the antenna circuit; and
  applying the rectified voltage to a conduction terminal of the modulation transistor and applying the alternating voltage on another conduction terminal of the transistor.

* * * * *